March 13, 1928.                J. A. GLASSMAN                     1,662,742
                                 LOUD SPEAKER
                              Filed Feb. 23, 1927            2 Sheets-Sheet 1
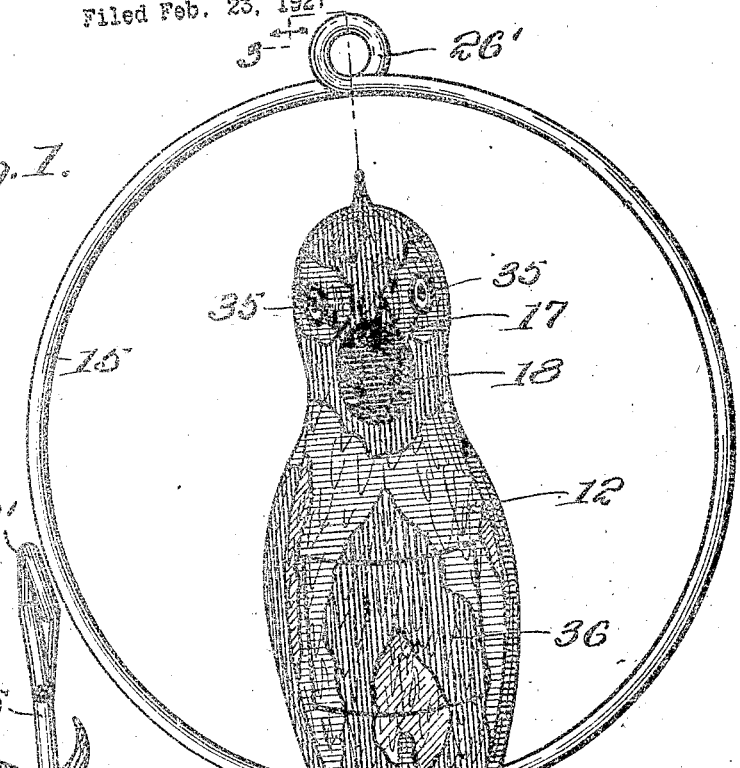
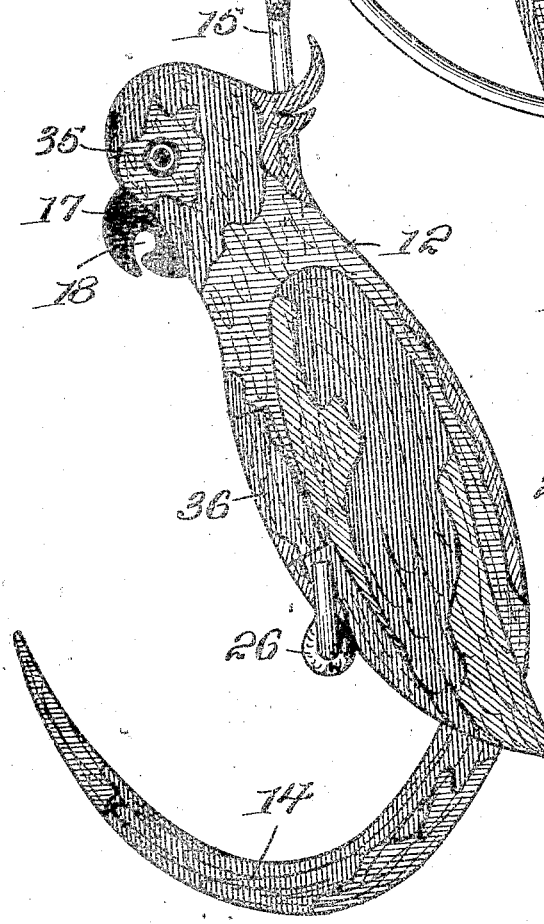
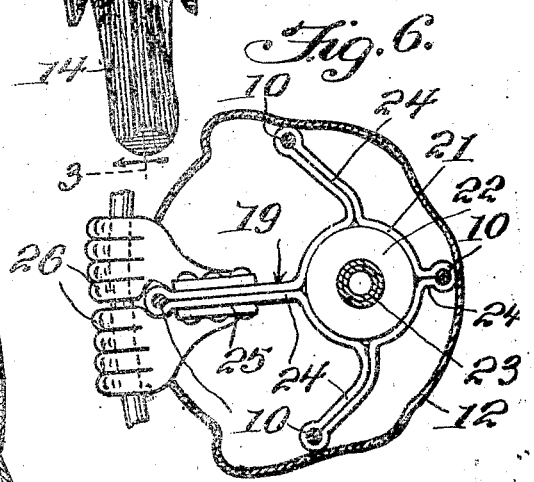
Jack A. Glassman INVENTOR
Victor J. Evans ATTORNEY

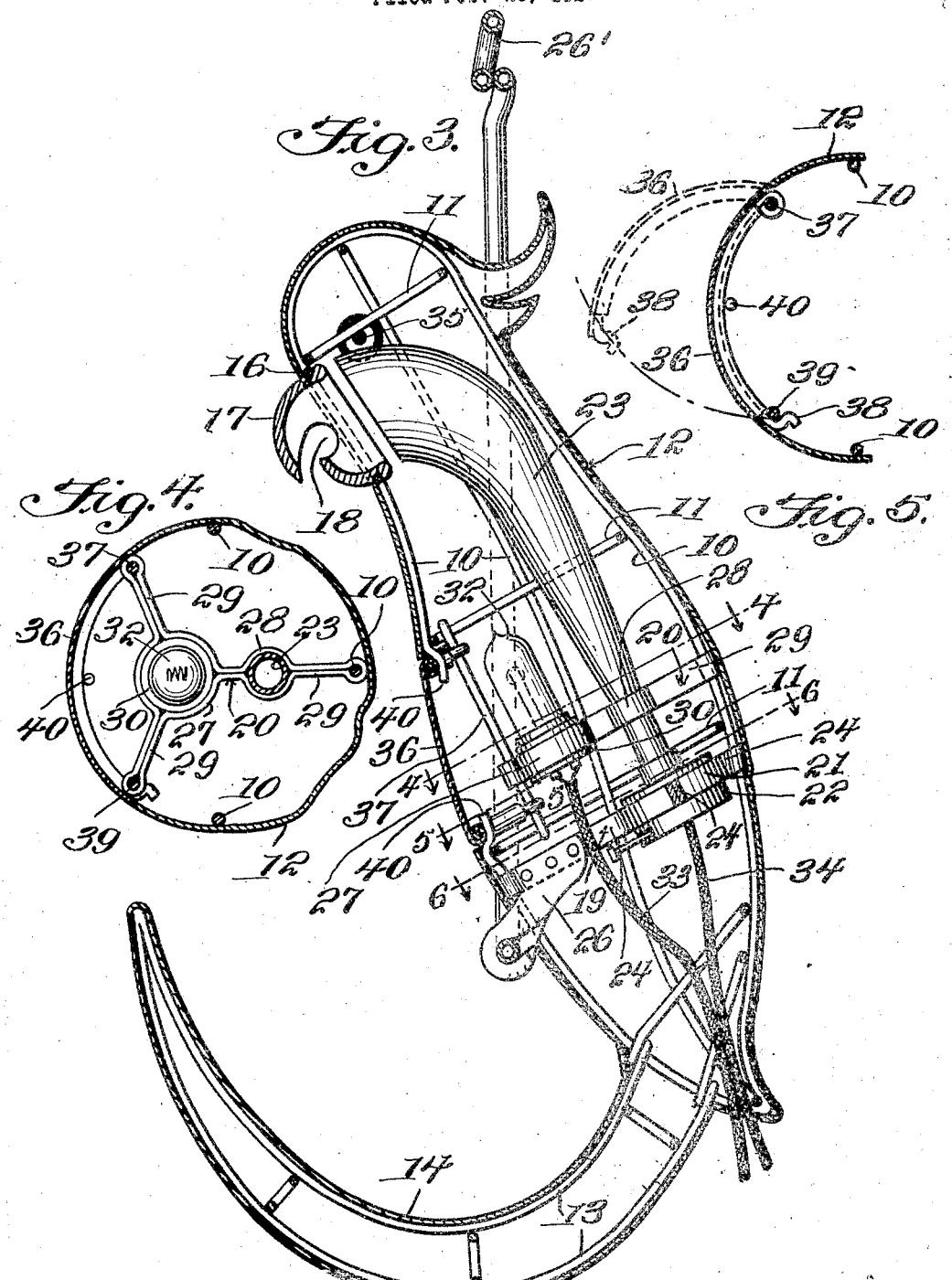

Patented Mar. 13, 1928.

1,662,742

UNITED STATES PATENT OFFICE.

JACK A. GLASSMAN, OF CHICAGO, ILLINOIS.

LOUD SPEAKER.

Application filed February 23, 1927. Serial No. 170,391.

This invention relates to loud speakers for radio receiving apparatus and has for an object the provision of a speaker which will be ornamental as well as useful, and which may be made to simulate the appearance of a bird, such as a parrot, and thus give the impression of a musical or talking parrot.

Another object of the invention is the provision of a novel frame structure and supporting means for a reproducing unit and horn within the bird, the supporting means also providing means for attaching the feet to the bird.

Another object of the invention is the provision of a device of the above character which in addition to serving as a loud speaker, may be made of translucent material and provided with a lamp, so as to form an attractive and ornamental object as well.

With the above and other objects in view, the invention further includes the following novel features and details of construction, to be hereinafter more fully described, illustrated in the accompanying drawings and pointed out in the appended claims.

In the drawings:—

Figure 1 is a front elevation of the invention.

Figure 2 is a side view of the bird with a portion of the perch broken away.

Figure 3 is an enlarged sectional view taken substantially on the line 3—3 of Figure 1.

Figures 4, 5 and 6 are sections taken substantially on the lines 4—4, 5—5 and 6—6 respectively, of Figure 3.

Referring to the drawings in detail wherein like characters of reference denote corresponding parts, the invention which is shown in the form of a parrot or bird mounted upon a perch, may be made in various forms, but it is preferred to construct the invention after the manner shown and described so as to imitate a talking parrot. For this purpose, there is provided a frame which is preferably constructed of wire and includes longitudinal members 10 and transverse connecting members 11, the said members being shaped so as to be provided with a cover 12 in the shape of the body and head of a parrot. An additional frame 13 extends forwardly beneath the body of the parrot and this frame is provided with a cover 14 which forms a continuation of the cover 12. The frame 13 and cover 14 are arranged to imitate the long curling tail of a parrot and as the latter is mounted upon a swinging perch 15, the position of the tail will act as a counterbalance to the weight of the body and maintain the same in an upright position. If desired, the feet of the bird may be rigid with the perch 15.

The cover 12 and the frame 10 are shaped to provide an opening 16 from which extends a bill or beak 17, the latter forming a sound escape opening 18.

Extending transversely within the body of the parrot are spaced spiders 19 and 20. Each of these spiders is made from a single strip of material shaped to provide a circular body portion and legs. The circular body portion of the spider 19 is indicated at 21 and is adapted to be clamped around a reproducer unit 22 from which extends a horn 23. The mouth of this horn is located adjacent the sound escape opening 18, so that when the invention is in use as a loud speaker, the sounds will escape through this opening in imitation of a talking parrot. Extending from the circular body portion 21 are arms 24 which engage around the longitudinal members 10 of the frame. Clamped to one of these arms as indicated at 25, are legs 26. These legs extend through the body of the parrot and engage over the perch 15. This perch is shown as of circular form and is provided with an eye 26', by means of which it may be suspended. A perch of different character however may be used.

The spider 20 is provided with spaced circular portions 27 and 28, the last mentioned portion being included in one of the arms 29 of the spider. These arms are looped about the longitudinal members 10 and the circular portion 28 receives the horn 23, so that the latter will be securely held in place. The other circular portion 27 is adapted to clamp around a lamp socket 30, within which may be placed an incandescent lamp 32. This lamp may receive current through a conductor 33, while a conductor 34 may extend to the reproducer unit 22. The parrot is provided with translucent eyes 35 and as the cover 13 of the frame is of translucent material, the parrot will be illuminated by the light of the lamp. It is preferred to color the cover 12 after the manner of the coloring of a parrot so as to produce a pleasing and ornamental effect.

The frame is provided with a door opening which is adapted to be closed by a door 36. One edge of this door is hingedly secured to a relatively short bar 37 of the frame and the opposite edge of the door is provided with resilient hooks 38 to engage over another short bar 39, whereby the door may be yieldingly held in closed position. A stop 40 assists in limiting inward movement of the door. The door is made of a suitable frame covered with a material similar to the material of the cover 12.

While the device is described as being suspended by means of the perch 15, it is of course feasible to mount the perch at the top of a stand instead of suspending the perch from the eye 26'.

The invention is susceptible of various changes in its form, proportions and minor details of construction and the right is herein reserved to make such changes as properly fall within the scope of the appended claims.

Having described the invention what is claimed is:—

1. In a loud speaker, a hollow member shaped to conform to the shape of a bird provided with feet and having an open mouth to provide a sound outlet, said member comprising a frame and a translucent cover for the frame, spaced spiders secured to and positioned transversely within the frame, a reproducer unit and horn supported by the spiders with the outlet end of the horn located adjacent the sound outlet, and the feet of the bird secured to one of the spiders and extending through the cover, and a support engaged by the feet of the bird.

2. In a loud speaker, a hollow member shaped to conform to the shape of a bird having an open mouth to provide a sound outlet, said member comprising a frame and a translucent cover for the frame, spaced spiders secured to and positioned transversely within the frame, a reproducer unit and horn supported by the spiders with the outlet end of the horn located adjacent the sound outlet, and the feet of the bird secured to one of the spiders and extending through the cover, a lamp carried by one of the spiders and a support engaged by the feet of the bird.

3. In a loud speaker, a hollow member shaped to conform to the shape of a bird having an open mouth to provide a sound outlet, said member comprising a wire frame including longitudinal members and transverse members, a reproducer unit within the hollow member, a horn extending from said unit and having its outlet end located adjacent the open mouth of the bird, spaced spiders, each of said spiders being formed from a single strip of metal and including a circular body portion and arms extending from said body portion and engaging the longitudinal members of the frame, the body portion of one spider engaging the horn and the body portion of the other spider engaging the reproducer unit, feet secured to the last referred to spider and extending through the cover to provide feet for the bird and a support engaged by the feet.

4. In a loud speaker, a hollow member shaped to conform to the shape of a bird having an open mouth to provide a sound outlet, said member comprising a wire frame including longitudinal members and transverse members, a reproducer unit within the hollow member, a horn extending from said unit and having its outlet end located adjacent the open mouth of the bird, spaced spiders, each of said spiders being formed from a single strip of metal and including a circular body portion and arms extending from said body portion and engaging the longitudinal members of the frame, the body portion of one spider engaging the horn and the body portion of the other spider engaging the reproducer unit, feet secured to the last referred to spider and extending through the cover to provide feet for the bird and a support engaged by the feet and means included in the first referred to spider to engage a lamp socket.

In testimony whereof I affix my signature.

JACK A. GLASSMAN.